United States Patent
Ha

(10) Patent No.: US 10,059,836 B1
(45) Date of Patent: Aug. 28, 2018

(54) ECO-FRIENDLY FILLER FOR ARTIFICIAL GRASS AND MANUFACTURING METHOD THEREOF

(71) Applicant: Sung Hee Ha, Daegu (KR)

(72) Inventor: Sung Hee Ha, Daegu (KR)

( * ) Notice: Subject to any disclaimer, the term of this patent is extended or adjusted under 35 U.S.C. 154(b) by 0 days.

(21) Appl. No.: 15/950,208

(22) Filed: Apr. 11, 2018

(30) Foreign Application Priority Data

Apr. 13, 2017 (KR) .................. 10-2017-0047820

(51) Int. Cl.
| | |
|---|---|
| *C08L 23/06* | (2006.01) |
| *E01C 13/08* | (2006.01) |
| *C08J 3/20* | (2006.01) |
| *C08L 9/06* | (2006.01) |
| *B29C 47/00* | (2006.01) |
| *B29K 511/00* | (2006.01) |
| *B29K 509/00* | (2006.01) |

(52) U.S. Cl.
CPC .............. *C08L 23/06* (2013.01); *C08J 3/203* (2013.01); *C08L 9/06* (2013.01); *E01C 13/08* (2013.01); *B29C 47/0004* (2013.01); *B29K 2023/06* (2013.01); *B29K 2509/00* (2013.01); *B29K 2511/00* (2013.01); *C08J 2309/06* (2013.01); *C08J 2323/06* (2013.01); *C08J 2409/06* (2013.01); *C08J 2423/06* (2013.01)

(58) Field of Classification Search
CPC ... C08L 23/06; C08L 9/06; C08J 3/203; C08J 2409/06; C08J 2309/06; C08J 2323/06; C08J 2423/06; B29K 2023/06; B29K 2509/00; B29K 2511/00; B29C 47/0004; E01C 13/08
See application file for complete search history.

(56) References Cited

FOREIGN PATENT DOCUMENTS

| | | |
|---|---|---|
| KR | 10-0799262 B1 | 1/2008 |
| KR | 10-0995211 B1 | 11/2010 |
| KR | 10-2011-0046778 A | 5/2011 |
| KR | 10-1037137 B1 | 5/2011 |
| KR | 10-1352409 B1 | 1/2014 |
| KR | 10-2016-0034559 A | 3/2016 |
| KR | 10-1610679 B1 | 4/2016 |

OTHER PUBLICATIONS

Machine translation of KR100799262 (B1), Jan. 30, 2008, p. 1-7.*
Machine translation of KR101610679 (B1), Apr. 8, 2016, p. 1-6.*
Machine translation of KR20160034559 (A), Mar. 30, 2016, p. 1-5.*

* cited by examiner

*Primary Examiner* — Robert S Jones
(74) *Attorney, Agent, or Firm* — Rabin & Berdo, P.C.

(57) ABSTRACT

Disclosed is an eco-friendly infill for artificial turf, which is made of eco-friendly components to have insect-repellent, antimicrobial, and water purification properties. Further disclosed is a method of preparing the eco-friendly infill. The eco-friendly infill is installed on a base layer of an artificial turf system to fill gaps between pile-fibers of the artificial turf system, thereby forming an infill layer having a predetermined thickness. The eco-friendly infill includes 8 to 15 wt % of bark powder excluding cinnamon powder, 8 to 15 wt % of zeolite, 3 to 8 wt % of lacquer powder or lacquer, 3 to 10 wt % of cinnamon powder, 15 to 25 wt % of calcium carbonate, 15 to 25 wt % of polyethylene, 15 to 25 wt % of at least one elastic material selected from the group consisting of SEBS, latex, and silicone rubber, and 5 to 15 wt % of oil.

5 Claims, 3 Drawing Sheets

ECO-FRIENDLY FILLER FOR ARTIFICIAL GRASS AND MANUFACTURING METHOD THEREOF

CROSS REFERENCE TO RELATED APPLICATION

The present application claims priority to Korean Patent Application No. 10-2017-0047820, filed Apr. 13, 2017, the entire contents of which is incorporated herein for all purposes by this reference.

BACKGROUND OF THE INVENTION

Field of the Invention

The present invention relates to an eco-friendly infill for artificial turf and a method of preparing the same. More particularly, the present invention relates to an eco-friendly infill for artificial turf, which is formed by mixing polyethylene (PE) and styrene ethylene butadiene styrene (SEBS) with an eco-friendly natural material composed of bark powder (bark powder of coniferous trees such as pine trees and Korean pine trees), cinnamon powder (bark powder of trees of Lauraceae, such as cinnamon or cassia), and lacquer powder (or the sap of a lacquer tree, which is also simply called lacquer) and by performing extrusion molding with the resulting mixture to produce the eco-friendly infill, whereby the eco-friendly infill has rainwater purification, insect repellent, and antimicrobial properties and is harmless to health, and the present invention also relates to a method of preparing the eco-friendly infill.

Description of the Related Art

In baseball fields or soccer fields, the fields are usually covered by natural grass to prevent the generation of dust. However, natural grass is expensive and difficult to manage. For this reason, recently artificial turf that has a natural grass texture and can be used for a long period of time has been increasingly used.

Generally, artificial turf is a synthetic turf system including a grass layer made of a plurality of pile-fibers and an infill composed of particles or chips and provided between the pile-fibers. Styrene-butadiene rubber (SBR) chips or ethylene propylene diene monomer (EPDM) rubber chips are widely used as the infill.

However, since waste tire (rubber) chips have a black color, they can absorb sunlight well to raise the temperature of the playing field, thereby deteriorating the environment for athletic play. Moreover, in summer when the temperature usually exceeds 30° C., the following problems occur: a bad smell occurs; the rubber chips are melted by geothermal heat, thereby becoming sticky and agglomerating; toxic gases are released; and low water content and large frictional heat of the rubber chips cause a risk of abrasion or burning when users or athletes slip, slide, or fall down.

Particularly, when the waste tire (rubber) chips are used for a long period of time, dust particles are generated and toxic substances such as heavy metals are released into the air. In addition, the dusts stick to shoes or clothes of the athletes playing on the artificial turf, thereby negatively affecting athlete health.

In order to solve the problems with the use of the waste tire (rubber) chips as an artificial turf infill, elastic polymers prepared through cross-linking of SEBS or EPDM rubber are widely used. However, since these elastic polymers also contain hazardous chemicals, these also cause various problems such as odor and unique smells of chemicals during long-term use or in the hot summer months.

SUMMARY OF THE INVENTION

Accordingly, the present invention has been made keeping in mind the above problems occurring in the related art, and an object of the present invention is to provide an eco-friendly infill for artificial turf, which is made of eco-friendly components such as bark power and cinnamon powder, thereby having insect repellent, antimicrobial, and water purification properties. Another object of the present invention is to provide a method of preparing the same eco-friendly infill.

In order to accomplish the above object, the present invention provides an eco-friendly infill for artificial turf, which fills gaps between each of pile-fibers 21 of an artificial turf system 20 to form an infill layer 30 to the extent of a predetermined thickness on a base layer 22 of the artificial turf system 20, the eco-friendly infill including 8 to 15 wt % (hereinafter, wt % means % by weight) of bark powder, 8~15 wt % of zeolite, 3 to 8 wt % of lacquer powder or lacquer, 3 to 10 wt % cinnamon powder, 15 to 25 wt % of calcium carbonate, 15 to 25 wt % of polyethylene, 15 to 25 wt % of at least one elastic material selected among SEBS, latex, and silicone rubber, and 5 to 15 wt % of oil.

As described above, the eco-friendly infill according to the present invention is composed of only natural components, thereby not releasing toxic chemicals harmful to health. Furthermore, cinnamon powder, lacquer powder (or lacquer), and zeolite prevent various kinds of viruses or bacteria such as fungi from growing and multiplying, thereby having an advantage of disinfection. Yet furthermore, the eco-friendly infill has a water or rainwater purification function.

Since the eco-friendly infill according to the present invention contains cinnamon powder, it is strongly antimicrobial and mite-preventive. In the case where the infill contains softened cinnamon powder resulting from two times of heat treatment and two times of cooling that are alternately performed, cinnamon oil exhibits a surface coating effect, which improves an antimicrobial performance and an insect-repellent performance.

Since the surface of the zeolite is treated (i.e., coated) with polyethylene (PE), the bark powder, the cinnamon powder, and the lacquer powder are mixed with the surface-treated zeolite. Therefore, the natural components including the bark powder, the cinnamon powder and the lacquer powder can be coated on and fixed well to the surface of the zeolite.

The eco-friendly infill according to the present invention has moisturizing and filtering effects because both of the natural material powder and the zeolite are porous. That is, the eco-friendly infill can absorb and retain moisture and fine dust, and also has a function of slowly releasing the captured moisture into the air when the temperature of artificial turf rises, thereby providing an effect of controlling the temperature of the field or ground paved with the artificial turf.

The eco-friendly infill according to the present invention includes the bark powder of coniferous trees such as a pine tree, which contains a large amount of antioxidant components such as polyphenols and flanovoids, thereby imparting a strong anti-inflammatory property and an antimicrobial property to artificial turf. Therefore, the present invention is very beneficial to user health.

According to the present invention, at least one elastic material selected from among SEBS, latex and silicone rubber is mixed and coated, the eco-friendly infill has a predetermined elasticity and an elastic restoring ability, thereby being unlikely to break when an external impact is applied thereto, which results in advantages of suppression of fine dust, etc.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
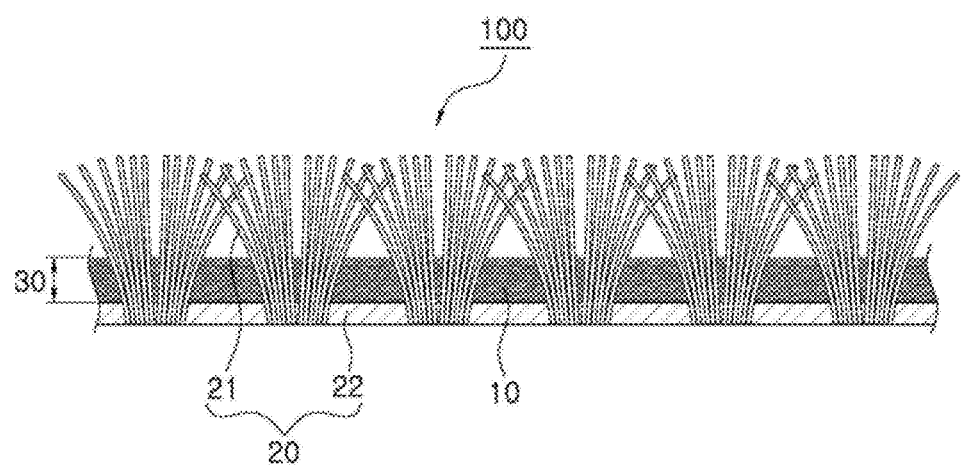
FIG. 1 is a view illustrating an exemplary state in which an eco-friendly infill for artificial turf, according to the present invention, is infilled in an artificial turf system.

FIG. 1 is a view illustrating a state in which an eco-friendly infill for artificial turf, according to the present invention, is installed. According to the present invention, an eco-friendly infill 10 fills gaps between pile-fibers 21 of an artificial turf system 20, thereby forming an infill layer 30 having a predetermined thickness on a base layer 22 of the artificial turf system 20. The eco-friendly infill includes 8 to 15 wt % of bark powder (excluding cinnamon powder), 8 to 15 wt % of zeolite, 3 to 8 wt % of lacquer powder or lacquer, 3 to 10 wt % of cinnamon powder, 15 to 25 wt % of calcium carbonate, 15 to 25 wt % of polyethylene (PE), 15 to 25 wt % of at least one elastic material selected from among SEBS, latex, and silicone rubber, and 5 to 15 wt % of oil.

The bark powder is bark powder of trees except for cinnamon or cassia. Preferably, the bark powder may be the powder of the bark of coniferous trees such as pine trees, Korean pine trees, Korean fir trees, Chinese juniper trees, etc. More preferably, the bark powder may be the powder of the bark of pine trees.

The bark powder of coniferous trees contains various volatile antimicrobial substances, for example, natural polyphenol, thereby exhibiting not only strong anti-inflammatory and antimicrobial effects but also contributing to beneficial biological activities such as antioxidant activity, antiviral activity, immunity intensification, reduction of asthma symptoms, blood circulation promotion, and enhancement of mobility of the living body.

The prepared bark powder is first sterilized by using steam, dried in hot air at a temperature range of 60 to 90° C. for 4 to 8 hours, and pulverized to 100 to 500 mesh.

In addition, the bark powder has excellent moisture control ability and odor adsorptivity. Furthermore, since it is prepared from an outer layer rather than a cork-forming layer of a tree trunk, it has excellent breathability and drainability.

The zeolite is a typical far-infrared radiation material and has a function of adsorbing positive ions of radiation besides an effective purifying or filtering function of adsorbing various metal ions. The sodium (Na) ions contained in the zeolite perform ion exchange with calcium (Ca) ions and magnesium (Mg) ions contained in water, thereby purifying rainwater flowing into the artificial turf during raining.

In the present invention, the zeolite is added in an amount of 8 to 15 % by weight (hereinafter, referred to as wt %), based on the total weight of a raw material mixture for producing the eco-friendly infill of the invention, so as to enhance antimicrobial activity and to realize a far-infrared radiation function beneficial to the human body by utilizing ion exchangeability of zeolite. That is, when the zeolite is added in an amount of less than 8 wt %, the far-infrared radiation effect is deteriorated. On the other hand, when the zeolite is added in an amount exceeding 15 wt %, the adsorptivity is excessively strong, thereby deteriorating the dispersibility of the other components. Therefore, the content of the zeolite needs to be well controlled. According to the present invention, the zeolite preferably has a particle size of 250 to 350 μm.

The zeolite undergoes heat treatment after being mixed with polyethylene (PE). Through the heat treatment, the specific surface area and porosity of the zeolite are improved, resulting in the zeolite having excellent absorbent and antimicrobial properties as well as having increased strength.

The lacquer powder or lacquer is coated on or infiltrated into a molded product, thereby imparting moisture-proof, insect repellent, flame-retarding and antimicrobial properties to the molded product. Particularly, the lacquer powder or lacquer penetrates into the bark powder and the cinnamon powder that constitute the body of the molded product, thereby preventing the natural powder from being carbonized during heat treatments and enabling the molded product to be preserved for a long period of time. In addition, the lacquer powder or lacquer also penetrates into the pores of the zeolite and calcium carbonate, so that the moisture-proof, insect repellent, flame-retardant and antimicrobial effects can be maintained for a long period of time.

That is, the lacquer powder or lacquer is mixed with the bark powder and the cinnamon powder in a raw material preparation stage of the eco-friendly infill to prevent the carbonization of the natural powder during the heat treatment and to preserve the natural powder for a long period of time.

The cinnamon powder functions to further enhance the antimicrobial effect. When the cinnamon powder is added in an amount of less than 3 wt %, the antimicrobial effect of the cinnamon powder is insufficient. On the contrary, it is added in an amount exceeding 10 wt %, the cinnamon power emits an excessively strong scent and deteriorates the moldability of the raw material mixture for the eco-friendly infill for artificial turf. The preparation method for the cinnamon powder is not particularly limited. However, the cinnamon power is preferably prepared by freeze-drying and then pulverizing the bark of cinnamon trees.

For the softening of the cinnamon powder, the cinnamon powder is heat-treated at a temperature range of 90 to 95° C. for 8 to 10 minutes, then cooled to a temperature range of 20 to 40° C., then heat-treated again at a temperature range of 90 to 95° for 8 to 10 minutes, and finally cooled again to a temperature range of 20 to 40° C.

The cinnamon powder can be more effectively softened when undergoing a process in which the two heat treatments are performed under the same conditions and the two coolings are also performed under the same conditions as described above than when undergoing a process in which the two heat treatments are performed under different conditions and the two coolings are performed under different conditions. That is, the antimicrobial substance in the cinnamon powder can be better extracted. When the cinnamon powder undergoes the former process, it exhibits about 2- to 4-fold stronger antimicrobial activity.

Furthermore, when the two same-condition heat treatments and the two same-condition coolings are alternately and successively performed, cinnamon oil can be extracted during the heat treatments and then cooled and fixed on the surface during the coolings. Therefore, the surface coating effect also can be obtained by the cinnamon oil, which further improves the antimicrobial performance and the repelling performance. That is, the cinnamon powder softened through the heat treatments not only has an antimicrobial effect of about 3 to 8 times that of the untreated cinnamon powder, but also has a long-term repelling capability due to the surface coating action of the cinnamon oil.

When either the heat treatment or the cooling is performed more than two times, the surface coating effect of the cinnamon oil is rather reduced. Therefore, it is preferable that each of the heat treatment and the cooling process is performed twice.

According to the present invention, the composition of the eco-friendly infill for artificial turf may further include 2 to 5 wt % of citric acid. The citric acid is an antimicrobial agent having a strong sterilizing power. When the citric acid is mixed with the cinnamon powder, the antimicrobial activity is further increased. However, when the content of the citric acid exceeds 5 wt %, the citric acid acts to suppress the exhibition of the merits of the other components and to deteriorate the moldability of the raw material mixture for the eco-friendly infill for artificial turf. On the other hand, when the content of the citric acid is less than 2 wt %, the antimicrobial effect is deteriorated.

The calcium carbonate (CaCO3) is a reinforcing agent added to prevent the loss (washing out) of the infill by increasing the specific gravity of the eco-friendly infill. When the content of the calcium carbonate exceeds 25 wt %, the elasticity of the infill is decreased. On the other hand, when the content is less than 15 wt %, the loss of the infill occurs due to rainwater or the like when installed on a field or playground.

Polypropylene (PE) is a non-toxic material and does not carry endocrine disrupting chemicals (EDC). In addition, PE enhances the flexibility and elasticity of an elastic material. When the polyethylene is mixed with zeolite and then melted to be coated on the substrate of zeolite, the polyethylene improves blendability and moldability of the raw material mixture for an artificial turf infill, including the bark powder, cinnamon powder, and an elastic material.

That is, the polyethylene is mixed with zeolite and then the mixture of the zeolite and polyethylene is heated to a melting point (85 to 110° C.) of the polyethylene to be coated on the surface of the zeolite. The polyethylene improves the blendability, adhesiveness, and moldability of the raw material mixture including the bark powder, the cinnamon powder, and an elastic material selected from the group consisting of SEBS, latex, and silicone rubber.

When the polyethylene is added in an amount less than 15 wt %, the effect of improving the elasticity of the elastic material is insignificant, and the adhesion between the zeolite and the mixture of natural components such as the bark powder and the cinnamon powder is weak. On the other hand, when the content of the polyethylene exceeds 25 wt %, the antimicrobial effect is deteriorated. Therefore, the proportion of the polyethylene needs to be carefully controlled to be within an appropriate range.

The styrene-ethylene/butylene-styrene (SEBS) has the most similar properties to natural rubber. That is, it imparts elasticity and reversibility (elastic restoring ability) to an artificial turf infill and has impact resistance and an anti-slip effect. Since SEBS has a block structure, it prohibits crosslinking among components during compounding of the components.

The latex (natural latex) or silicone rubber imparts elasticity and reversibility (elastic restoring ability) and has impact resistance and an anti-slip effect. In the present invention, the SEBS is preferably added as an elastic material.

When such an elastic material is added in an amount of less than 15 wt %, the elasticity and the anti-slip effect are insignificant. On the other hand, when the elastic material is added in an amount exceeding 25 wt %, the tear strength is insignificant.

The oil is added as a softening agent, and it may be any kind of oil known as an additive to conventional infills for artificial turf. Examples of the oil used as an softening agent in the present invention may include naphthenic oils, paraffinic oils, aromatic oils, dibasic acid ester (such as dioctyl phthalate, dibutyl phthalate, and diisononyl phthalate), and paraffinic or paraffin-naphthenic mineral oils.

Figure 2:
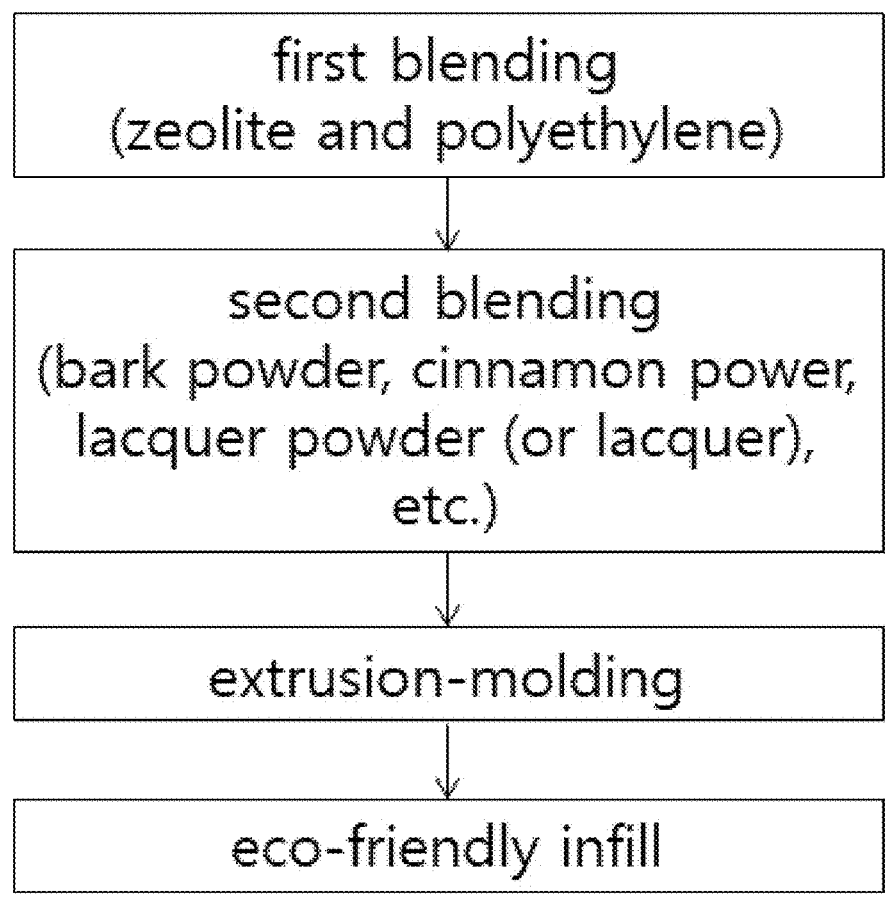
FIG. 2 is a block diagram illustrating an exemplary preparation method of the eco-friendly infill according to the present invention.

FIG. 2 is a block diagram illustrating a method of preparing an eco-friendly infill for artificial turf, according to one embodiment of the present invention.

According to the embodiment, the method includes: a first blending process of mixing zeolite and polyethylene to produce a primary mixture and stirring the primary mixture on heating at a temperature range of 85 to 110° C. for 10 to 20 minutes; a second blending process of adding bark powder, lacquer powder or lacquer, cinnamon powder, calcium carbonate, an elastic material, and oil to the well-stirred primary mixture resulting from the first blending process to produce a secondary mixture and then stirring the secondary mixture on heating at a temperature range of 85 to 110° C. for 10 to 20 minutes; and a extrusion molding process of extrusion-molding the secondary mixture resulting from the second blending process to produce molding products to serve as an eco-friendly infill for artificial turf.

In the first blending process, 8 to 15 wt % of zeolite and 15 to 25 wt % of polyethylene (PE), each based on the total amount of the secondary mixture described above, are mixed. In the second blending process, 8 to 15 wt % of bark powder, 3 to 8 wt % of lacquer powder or lacquer, 3 to 10 wt % of cinnamon powder, 15 to 25 wt % of calcium carbonate, 15 to 25 wt % of at least one elastic material selected from the group consisting of SEBS, latex and silicone rubber, and 5 to 15 wt % of oil are added to the resulting mixture of the first blending process and then mixed. Alternatively, in the second blending process, 2 to 5 wt % of citric acid may be further added.

The resulting mixture of the second blending process is used for extrusion molding to produce granular eco-friendly infill for artificial turf. The granular infill has a particle size of 1.0 to 5.0 mm, a specific gravity of 1.1 to 1.8 g/cm3, a tensile strength of 18 to 24 kg/cm2, and has an antimicrobial performance of 99.9%.

Example 1

10 wt % of zeolite and 20 wt % of polyethylene were mixed and stirred at a temperature range of 85 to 110° C. for about 20 minutes to produce a primary mixture. Then, 10 wt % of bark powder (powder of pine bark), 5 wt % of lacquer powder, 5 wt % of cinnamon powder, 20 wt % of SEBS, and 10 wt % of oil were added to the primary mixture and then stirred together at a temperature range of 80 to 100° C. for about 30 minutes to produce a secondary mixture and the resulting secondary mixture is then subjected to extrusion molding.

Figure 3:
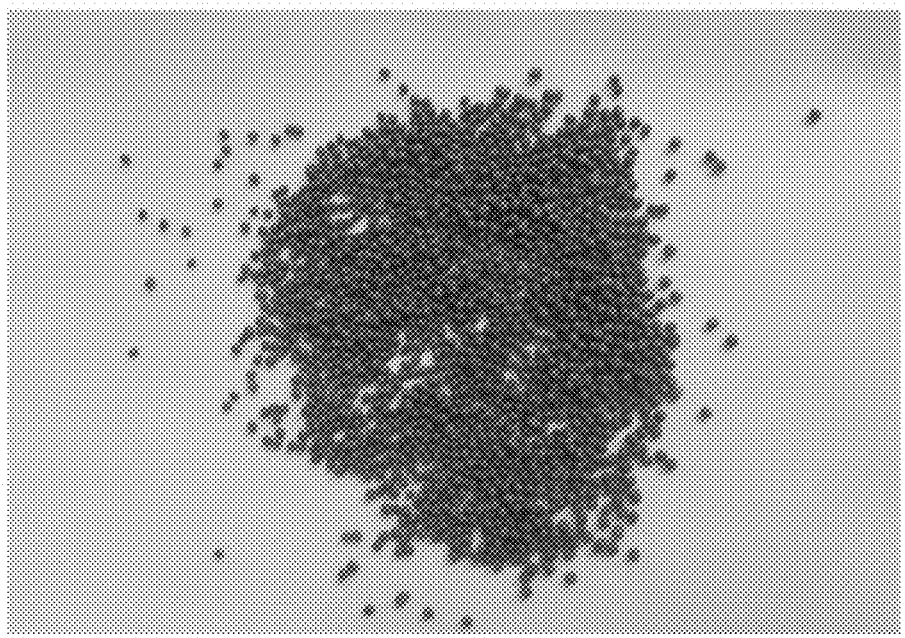
FIG. 3 is a photograph illustrating an example of the eco-friendly infill according to the present invention.

As a result, as shown in FIG. 3, granular eco-friendly infill free from surface cracking was produced.

Example 2

10 wt % of zeolite and 20 wt % of polyethylene were mixed and stirred at a temperature range of 85 to 110° C. for about 20 minutes to produce a primary mixture. 10 wt % of bark powder (pine bark), 5 wt % of lacquer powder, 5 wt % of cinnamon powder, 20 wt % of calcium carbonate, 20 wt % of SEBS, and 10 wt % of oil were added to the primary mixture and stirred together at a temperature range of 80 to 100° C. for about 30 minutes to produce a secondary mixture. The resulting secondary mixture was molded into a test piece having a size of 5 cm×5 cm and the test piece was tested for its antimicrobial activity.

At this time, a stomacher film having a size of 5 cm×5 cm was used as a control group, and the test results are shown in Table 1.

Although the present invention has been described with reference to preferred embodiments, the preferred embodiments are presented to describe the technical spirit of the present invention only for illustrative purposes and those skilled in the art will appreciate that various modifications and changes are possible, without departing from the scope and spirit of the present invention. Therefore, it should be understood that the protection scope of the present invention is defined by the accompanying claims rather than the description which is presented above. Moreover, the present invention is intended to cover not only the exemplary embodiments but also various alternatives, modifications, equivalents and other embodiments that may be included within the spirit and scope of the embodiments as defined by the appended claims.

What is claimed is:

1. An eco-friendly infill for artificial turf, the infill comprising:
    8 to 15 wt % of bark powder excluding cinnamon powder;
    8 to 15 wt % of zeolite;
    3 to 8 wt % of lacquer powder or lacquer;
    3 to 10 wt % of cinnamon powder;
    15 to 25 wt % of calcium carbonate;
    15 to 25 wt % of polyethylene (PE);
    15 to 25 wt % of at least one elastic material selected from the group consisting of SEBS, latex, and silicone rubber; and
    5 to 15 wt % of oil,
    wherein the cinnamon powder is softened through a first heat treatment performed at a temperature range of 90 to 95° C. for 8 to 10 minutes, a first cooling to a temperature range of 20 to 40° C., a second heat treatment performed at a temperature range of 90 to 95° C. for 8 to 10 minutes, and a second cooling to a temperature range of 20 to 40° C.

2. The eco-friendly infill according to claim 1, wherein the bark powder is powder of bark of coniferous trees.

3. The eco-friendly infill for artificial turf, according to claim 1, further comprising: 2 to 5 wt % of citric acid.

4. A method for preparing an eco-friendly infill for artificial turf, the method comprising:
    a first blending process of mixing zeolite and polyethylene and stirring together while heating at a temperature range of 85 to 110° C. for 10 to 20 minutes to produce a primary mixture;
    a second blending process of adding lacquer powder or lacquer, cinnamon powder, calcium carbonate, oil, an elastic material selected from the group consisting of SEBS, latex, and silicone rubber, and bark powder excluding the cinnamon powder to the primary mixture and stirring the resulting mixture while heating at a temperature range of 80 to 100° C. for 20 to 30 minutes to produce a secondary mixture;
    an extrusion molding process of extrusion-molding the resulting secondary mixture to produce the eco-friendly infill,
    wherein the cinnamon powder is softened through a first heat treatment performed at a temperature range of 90 to 95° C. for 8 to 10 minutes, a first cooling to a temperature range of 20 to 40° C., a second heat treatment performed at a temperature range of 90 to 95° C. for 8 to 10 minutes, and a second cooling to a temperature range of 20 to 40° C.

5. The method according to claim 4, wherein the eco-friendly infill has a particle size of 1.0 to 5.0 mm, a specific gravity of 1.1 to 1.8 g/cm$^3$, and a tensile strength of 18 to 24 kg/cm$^2$.

* * * * *